(12) United States Patent
Winters et al.

(10) Patent No.: US 11,101,615 B2
(45) Date of Patent: Aug. 24, 2021

(54) USE OF ELECTRONICALLY CONTROLLED POLARIZATION ELEMENTS FOR THE INITIATION AND OPTIMIZATION OF LASER MODE-LOCKING

(71) Applicant: Thorlabs, Inc., Newton, NJ (US)

(72) Inventors: David Winters, Bothell, WA (US); Matthew S. Kirchner, Westminster, CO (US); Sterling J. Backus, Erie, CO (US)

(73) Assignee: Thorlabs, Inc., Newton, NJ (US)

( * ) Notice: Subject to any disclaimer, the term of this patent is extended or adjusted under 35 U.S.C. 154(b) by 77 days.

(21) Appl. No.: 16/305,299

(22) PCT Filed: Jun. 3, 2017

(86) PCT No.: PCT/US2017/035863
§ 371 (c)(1),
(2) Date: Nov. 28, 2018

(87) PCT Pub. No.: WO2017/210665
PCT Pub. Date: Dec. 7, 2017

(65) Prior Publication Data
US 2020/0335932 A1 Oct. 22, 2020

Related U.S. Application Data

(60) Provisional application No. 62/345,431, filed on Jun. 3, 2016.

(51) Int. Cl.
*H01S 3/11* (2006.01)
*H01S 3/067* (2006.01)
(Continued)

(52) U.S. Cl.
CPC ........ *H01S 3/1112* (2013.01); *H01S 3/06712* (2013.01); *H01S 3/06791* (2013.01);
(Continued)

(58) Field of Classification Search
None
See application file for complete search history.

(56) References Cited

U.S. PATENT DOCUMENTS 5,440,573 A * 8/1995 Fermann ................. H01S 3/067
372/11
5,530,582 A * 6/1996 Clark .................... H04B 10/291
359/333

(Continued)

OTHER PUBLICATIONS

Winters et al. ("Electronic initiation and optimization of nonlinear polarization evolution mode-locking in a fiber laser", Optics express , vol. 25, No. 26, Dec. 25, 2017) (Year: 2017).*
(Continued)

*Primary Examiner* — Tod T Van Roy
(74) *Attorney, Agent, or Firm* — Myers Wolin, LLC

(57) ABSTRACT

Apparatus for modelocking a fiber laser cavity includes two variable retarder assemblies and a polarizing element. The variable retarder assemblies each have two electronically addressable elements and one fixed element. The first variable retarder assembly prepares a polarization state suitable for NPE modelocking to be launched into the fiber, and the second variable retarder assembly controls the polarization state after exiting the fiber, before being incident on the polarizing element. A control system controls the electronically addressable phase retarders in order to create and modify conditions for modelocking the fiber laser.

20 Claims, 16 Drawing Sheets

(51) Int. Cl.
    H01S 3/106    (2006.01)
    H01S 3/13     (2006.01)
    H01S 3/10     (2006.01)
    G02F 1/03     (2006.01)
    G02F 1/01     (2006.01)

(52) U.S. Cl.
    CPC ........ *H01S 3/10061* (2013.01); *H01S 3/1065* (2013.01); *H01S 3/1305* (2013.01); *H01S 3/1308* (2013.01); *G02F 1/0136* (2013.01); *G02F 1/0311* (2013.01); *G02F 1/0322* (2013.01); *H01S 3/10053* (2013.01); *H01S 3/1307* (2013.01)

(56) References Cited

U.S. PATENT DOCUMENTS

| | | | | |
|---|---|---|---|---|
| 5,574,739 | A * | 11/1996 | Carruthers | H01S 3/06791 372/106 |
| 5,617,434 | A * | 4/1997 | Tamura | H01S 3/06791 372/6 |
| 5,658,490 | A * | 8/1997 | Sharp | G02F 1/13363 252/299.01 |
| 7,375,889 | B1 * | 5/2008 | Kelly | G02F 1/0136 359/320 |
| 2006/0182153 | A1 | 8/2006 | Liu | |
| 2007/0216993 | A1 * | 9/2007 | Aiso | H01S 3/1112 359/340 |
| 2008/0117940 | A1 * | 5/2008 | Tang | H01S 3/067 372/6 |
| 2009/0310207 | A1 * | 12/2009 | Maestle | G02B 27/286 359/249 |
| 2012/0033690 | A1 * | 2/2012 | Renninger | H01S 3/067 372/25 |
| 2016/0099537 | A1 * | 4/2016 | Fermann | H01S 3/06725 372/6 |
| 2019/0181606 | A1 * | 6/2019 | Peng | H01S 3/1112 |

OTHER PUBLICATIONS

Nikodem et al., Intracavity polarization control in mode-locked Er-doped fibre lasers using liquid crystals, Opto-Electronics Review, Mar. 19, 2014, vol. 22, No. 2, pp. 113-*117, Versita, Warszawa, Poland.

Jie et al., "A theoretical and experimental study on all-normal-dispersion Yb-doped mode-locked fiber lasers", Chinese Physics B, Apr. 5, 2013, vol. 22, No. 4, pp. 1-6.

Communication pursuatn to Article 94(3) EPC issued by the European Patent Office for corresponding European Patent Application No. 17807644.4, dated Feb. 5, 2020.

European Search Report issued by the European Patent Office for corresponding European Patent Application No. 17807644.4, dated Jan. 17, 2020.

Written Opinion issued by the European Patent Office for corresponding European Patent Application No. 17807644.4, dated Feb. 5, 2020.

First Office Action issued by the National Intellectual Property Administration, P.R.C. For corresponding Chinese Patent Application No. 201780045008.1, dated Jun. 30, 2020, with full English translation attached.

Chinese First Office Action, dated Jun. 30, 2020 in the corresponding Chinese patent application No. 201780045008.1, 3 pages.

Hofer, Martin, et al. "Characterization of ultrashort pulse formation in passively mode-locked fiber lasers." IEEE journal of quantum electronics 28.3 (1992): 720-728.

Brunton, Steven L., Xing Fu, and J. Nathan Kutz. "Extremum-seeking control of a mode-locked laser." IEEE Journal of Quantum Electronics 49.10 (2013): 852-861.

Brunton, Steven L., Xing Fu, and J. Nathan Kutz. "Self-tuning fiber lasers." IEEE Journal of Selected Topics in Quantum Electronics 20.5 (2014): 464-471.

Bale, Brandon G., et al. "Spectral filtering for high-energy mode-locking in normal dispersion fiber lasers." Josa B 25.10 (2008): 1763-1770.

Nelson, L. E., et al. "Ultrashort-pulse fiber ring lasers." Applied Physics B: Lasers & Optics 65.2 (1997).

Chong, Andy, et al. "All-normal-dispersion femtosecond fiber laser." Optics express 14.21 (2006): 10095-10100.

Radnatarov, Daba, et al. "Automatic electronic-controlled mode locking self-start in fibre lasers with non-linear polarisation evolution." Optics express 21.18 (2013): 20626-20631.

Olivier, Michel, Marc-Daniel Gagnon, and Michel Piché. "Automated mode locking in nonlinear polarization rotation fiber lasers by detection of a discontinuous jump in the polarization state." Optics express 23.5 (2015): 6738-6746.

Tamura, K., et al. "77-fs pulse generation from a stretched-pulse mode-locked all-fiber ring laser." Optics letters 18.13 (1993): 1080-1082.

Zhuang, Zhizhong, Seong-Woo Suh, and J. S. Patel. "Polarization controller using nematic liquid crystals." Optics letters 24.10 (1999): 694-696.

Shen, Xuling, et al. "Electronic control of nonlinear-polarization-rotation mode locking in Yb-doped fiber lasers." Optics Letters 37.16 (2012): 3426-3428.

Nikodem, M. et al "Intracavity polarization control in mode-locked Er-doped fibre lasers using liquid crystals." Opto-Electronics Review 22.2 (2014): 113-117.

* cited by examiner

USE OF ELECTRONICALLY CONTROLLED POLARIZATION ELEMENTS FOR THE INITIATION AND OPTIMIZATION OF LASER MODE-LOCKING

FIELD OF THE INVENTION

The present invention relates to a system for modelocking a laser oscillator using electronically-controlled polarization elements (e.g. liquid crystal (LC) elements) to set the conditions for modelocking through nonlinear polarization evolution (NPE).

BACKGROUND OF THE INVENTION

Nonlinear polarization evolution (NPE) is an established method for inducing modelocking in a laser. In NPE, the polarization state of a beam within the laser cavity can change in an intensity-dependent way through interaction with a material. When combined with a polarization element, this can cause an intensity-dependent transmission. If configured appropriately, this nonlinear polarization rotation can be an effective saturable absorber, where a decrease in optical loss within a laser cavity with increasing intensity is used to encourage pulse formation (modelocked operation) in laser oscillators.

To achieve the desired behavior, in which short pulses (having high intensity) experience less loss than continuous wave (CVV) operation (having low intensity), the polarization of the light into the nonlinear polarization-rotating medium must be controlled. This polarization control is typically implemented using one or more fixed retarders (wave plates) that can be rotated, manually or via a motorized rotation stage, to achieve the desired polarization state. Use of motorized rotation stages for polarization optics has been used to automatically identify the correct configuration for modelocking a fiber oscillator. Alternately, the necessary polarization control can be implemented using a fiber polarization controller which applies force to the fiber to induce a polarization change due to stress induced birefringence in the fiber. Motorized elements can be slow, requiring significant time to automatically mode lock the laser. Applying force to a fiber using (for example) a piezoelectric actuator can be fast, but requires high voltages to drive the actuator, and the resulting limited range of adjustment often requires user intervention to compensate. The ideal case would be one where electronic control is used to access all possible polarization states with the least number of actuators.

The NPE modelocking mechanism is particularly well suited for fiber lasers, where propagation in a guided mode allows for accumulation of nonlinear phase. In fact, the NPE mechanism, by virtue of its near-instantaneous nonlinear response ("fast" saturable absorber action) results in generation of the shortest possible pulse durations. However, it is also well known that the polarization state of light inside an optical fiber can rotate due to stress in the fiber, which can change over time or with environmental conditions such as temperature. In fact, it has been shown that even with dimensionally stable mounting of the optical fiber in the oscillator, materials relaxation from the original fabrication of the fiber itself will result in a continuous relaxation of the polarization rotation characteristics. Temperature, mechanical stress, and other factors also affect operation. The result is that although fiber lasers based on NPE modelocking can operate over periods of months without manual adjustment to re-optimize the NPE mechanism, during this period substantial drift in operation of the laser is evident, culminating in failure of the laser to modelock.

Electronically actuated retarders, such as nematic liquid crystals (LC), can be used akin to electrically controlled wave plates. Such retarders provide an attractive method of electrical control of polarization as the drive voltages are low (several tens of volts or less), their response time is short (approximately millisecond), and they have good stability over time. Other actuators such as ferroelectric or photopatterned liquid crystals, could also be appropriate for this use.

A single LC has been used to start NPE modelocking in an Erbium fiber laser in which the fiber itself was adjusted in a specific way to allow control using a single element. See, for example, M. Olivier, M.-D. Gagnon, and M. Piché, "Automated mode locking in nonlinear polarization rotation fiber lasers by detection of a discontinuous jump in the polarization state," Opt. Express 23, 6738-6746 (2015). This scheme was proven to be problematic, as it did not allow for change in the intrinsic birefringence of the fiber over time, in addition to any physical changes in the fiber orientation due to environmental perturbations. The authors suggest this could be compensated by the insertion and adjustment of traditional (fixed) wave plates, though this moves the system further from electronic control. An alternate LC based modelocking scheme was demonstrated in which an LC-based polarization controller was used to modelock an Erbium soliton fiber laser by controlling the polarization state for NPE. See M. Nikodem, K. Krzempek, K. Zygadlo, G. Dudzik, A. Waz, K. Abramski, and K. Komorowska, "Intracavity polarization control in mode-locked Er-doped fibre lasers using liquid crystals," Opto-Electronics Rev. 22, 113-117 (2014). This approach uses an arbitrary polarization control before the polarizer, which requires three LCs. As the polarizer enforces a linear polarization state, it is inefficient to have all three LCs in this position. Conversely, they use only a single LC after the polarizer, allowing them to control only the ellipticity, and not the linear polarization angle. This configuration does not allow full polarization control. The aforementioned drift of the fiber will necessitate full polarization control to ensure the laser can be kept modelocked.

Typical operation of NPE, as shown in FIG. 1 (Prior Art), requires a pulse 102 to be introduced into the nonlinear polarization-modulating medium 108 via a polarizer 104 and a quarter wave plate 106. Ellipticity 120 is introduced to the linearly-polarized pulse using quarter wave plate 106. The elliptically polarized pulse 120 then propagates in the nonlinear material 108, where the nonlinear polarization rotation occurs. The output 122 from this element is rotated 124 using a half-wave plate 110 before passing through a polarizer 112, resulting in output 114. This second wave plate 110 is set to compensate for the nonlinear polarization rotation and allow maximum transmission through the polarizer 112. At low intensity, with negligible nonlinear polarization rotation, the polarizer 112 will reject a significant fraction of the light from the cavity. As the intensity increases, the polarization rotates toward the direction that polarizer 112 passes. This effectively creates a condition where the loss for continuous (or CVV) light is higher than the loss for pulsed light, creating a saturable absorber and leading to modelocking.

FIG. 4a (Prior Art) is a schematic diagram showing a conventional all-normal dispersion (ANDi) laser 400. The laser cavity is divided into two sections: a section of single mode fiber 404 (both passive and doped fiber) and a free space section. The single mode fiber does not preserve polarization, allowing the NPE to take place. This is also typically the case for other NPE-modelocked oscillators. When the light exits the single mode fiber 424 its polarization is modified by a quarter wave plate 418 and half wave plate 416, allowing the arbitrary polarization in the fiber to be converted first into an arbitrary linear polarization (by the quarter wave plate) which can then be rotated to an arbitrary angle by the half wave plate. The light then travels through a polarizer 414, which passes some portion 420 of the light (which will be coupled back into the fiber) and rejects some other portion 422 (which can serve as the laser's output). The amount of light coupled out of the cavity depends on the angle to which the linear polarization is rotated by the half wave plate 416.

In this embodiment, the output coupling polarizer 414 is also the NPE polarizer, although this does not have to be the case. The transmitted cavity light 420 is spectrally filtered using birefringent plate 412 (which provides stable pulse formation in the ANDi laser) before transmission through a Faraday isolator 410 to ensure the light only propagates in one direction through the cavity. The output of the Faraday isolator is a linear polarization at 45 degrees. A quarter wave plate 408 after Faraday isolator 410 changes the linear polarization of the light into an elliptical polarization in which the degree of ellipticity is dependent on the rotation angle of quarter wave plate 408. This light is then coupled back into fiber 404.

This typical laser setup cannot access the full polarization phase space and therefore, cannot recover similar laser parameters for all environmental and laser drift perturbations. In some implementations of the ANDi laser, a second half wave plate is used before the quarter wave plate on the output side to allow more complete control of the polarization launched into the single mode fiber 404.

While this configuration is effective as a saturable absorber, there will also be some non-saturable loss present, since the ellipticity introduced before the nonlinear polarization-modulating medium is not removed. The nonsaturable loss can be reduced by removing this ellipticity with a quarter wave plate placed after the nonlinear medium but before the analyzing polarizer. Similarly, more control over the polarization at the input to the nonlinear material is generally needed, as the material will have some intrinsic birefringence caused by manufacturing, mechanical stresses or environmental conditions. This generally requires a second half wave plate be used as well, placed between the input polarizer and the nonlinear material.

A need remains in the art for apparatus and methods that allow for reliable operation of an NPE modelocked laser over extended periods of time with stable operating output.

SUMMARY

It is an object of the present invention to provide apparatus and methods that allow for reliable operation of an NPE modelocked laser over extended periods of time with stable operating output. Embodiments of the present invention make use of the advantages of NPE modelocking over alternate techniques: 1) fast saturable absorber action for the shortest possible pulses, and 2) avoidance of material saturable absorbers (SESAMs) that can degrade over time, also degrading operation of the laser. Embodiments utilize electronically-adjustable variable phase retarders for full control over the polarization parameters of a NPE modelocked laser, providing the ability to quickly modelock and optimize a NPE modelocked laser. The present invention also provides for automated identification of the optimal operating point of the laser, saving considerable labor in the initial construction of the laser.

Various algorithms can be used to utilize this configuration to automatically modelock the laser and/or find the optimum operating point with the desired spectral and pulse characteristics.

Preferred embodiments replace manually or electronically rotatable wave plates with electronically addressed liquid crystals, which have the benefit of rapid polarization state changes as well as low voltage control. In addition, the present invention is configured to fully address the entire set of polarization states allowed by the laser setup with the fewest amount of control elements, meaning it can rapidly recover from environmental or laser drift perturbations. As the intrinsic stresses in the fiber, as well as those caused by coiling and constraining the fiber, perturb the polarization state of the laser in a way that is dependent on fiber age as well as environmental conditions, polarization control at the output of the fiber is capable of converting any polarization state to a linear polarization state at any angle. Likewise, the polarization controller used just before coupling back into fiber is capable of taking the 45 degree linear polarization and converting it to an arbitrary polarization state. Three liquid crystals can be used to convert from one arbitrary polarization to another arbitrary polarization, but this is a general solution that is more complex than is needed. Conversion between an arbitrary polarization state and an arbitrary linear polarization is preferably accomplished using two liquid crystals and a fixed quarter wave retarder in various configurations.

To demonstrate this, consider a field polarized at an angle a with ellipticity b. Components of the Jones vector in the x and y directions can be represented as $Ex=\cos(a)$ and $Ey=\sin(a) \exp(ib)$, respectively. Defining c as the retardance of the electronically addressed variable retarder oriented along the x axis and d as the retardance of the electronically addressed variable retarder at 45° relative to the x axis, we can then write the polarization of light having propagated through both elements as a function of the initial state and the two retardances.

To convert the arbitrary polarization described above to an arbitrary linear polarization, as required, we first require that the ellipticity be removed. This requires $c-b=\pi/2$, which can be achieved for any input b by requiring c have a range of at least one wave. Likewise, the linear polarization angle at the output is given by $d-2a$, which again can take on any value if the retardance d has a range of at least one wave.

The other requirement is the conversion of a linear polarization state into an arbitrary polarization state. For example, consider a linear polarization at 45 degrees (the calculation would be substantially similar for other input polarizations). In this case, the Stokes vector for the output polarization can be written $S1=\sin(c)\sin(d)$, $S2=\sin(c)\cos(d)$, and $S3=\cos(d)$. These equations define a sphere of unit radius and are equivalent to the definition of the Poincaré Sphere, the surface of which contains all pure polarization states. This demonstrates the capability of this system to access all polarization states.

DETAILED DESCRIPTION OF THE INVENTION

Figure 1:
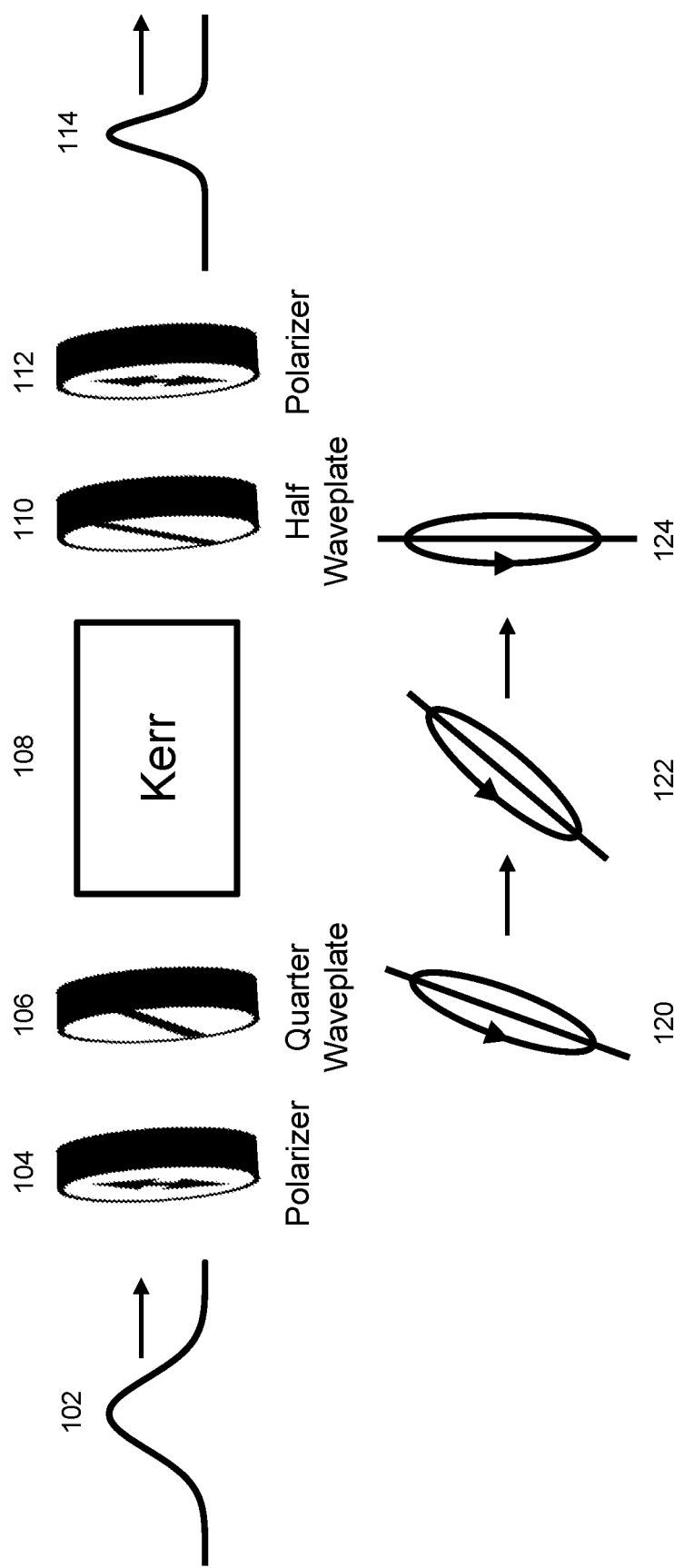
FIG. 1 (Prior Art) is a diagram of a conventional NPE saturable absorber.
Figure 2:
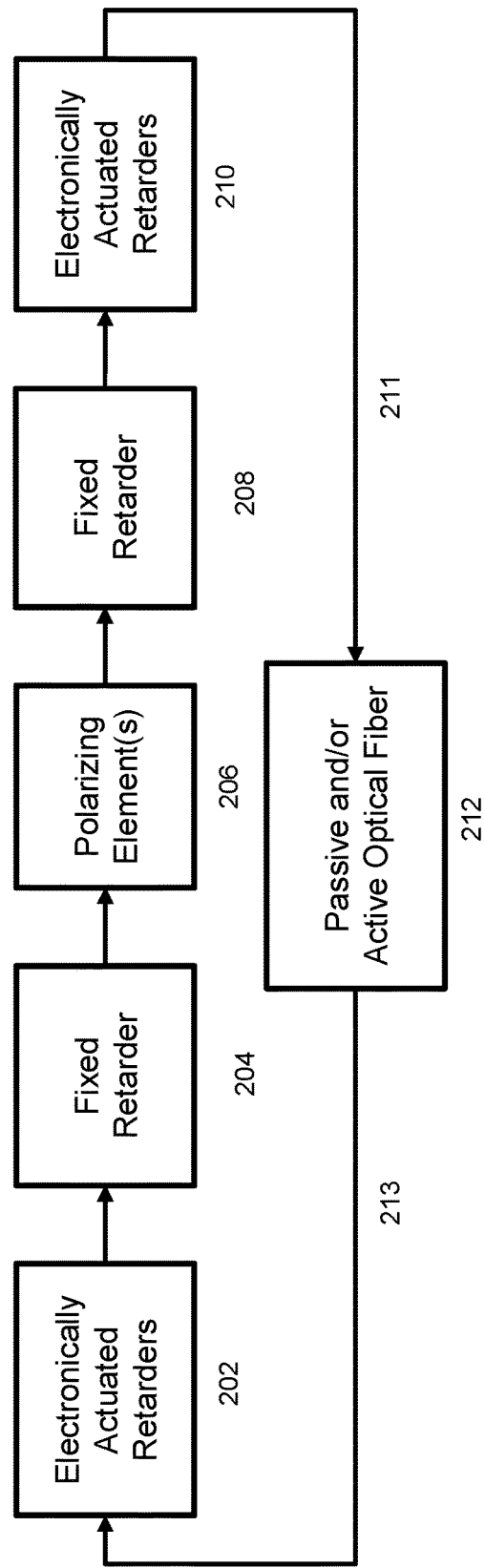
FIG. 2 is a flowchart illustrating generalized laser operation according to the present invention.

FIG. 2 is a flowchart illustrating generalized laser operation 200 according to the present invention. Combinations of the fixed and electronically actuated retarders 202, 204, 208, 210 are placed at either end of a section of optical fiber 212, with polarization optics 206 (e.g., polarizers, faraday isolators, etc.) in between the combinations.

Figure 3A:
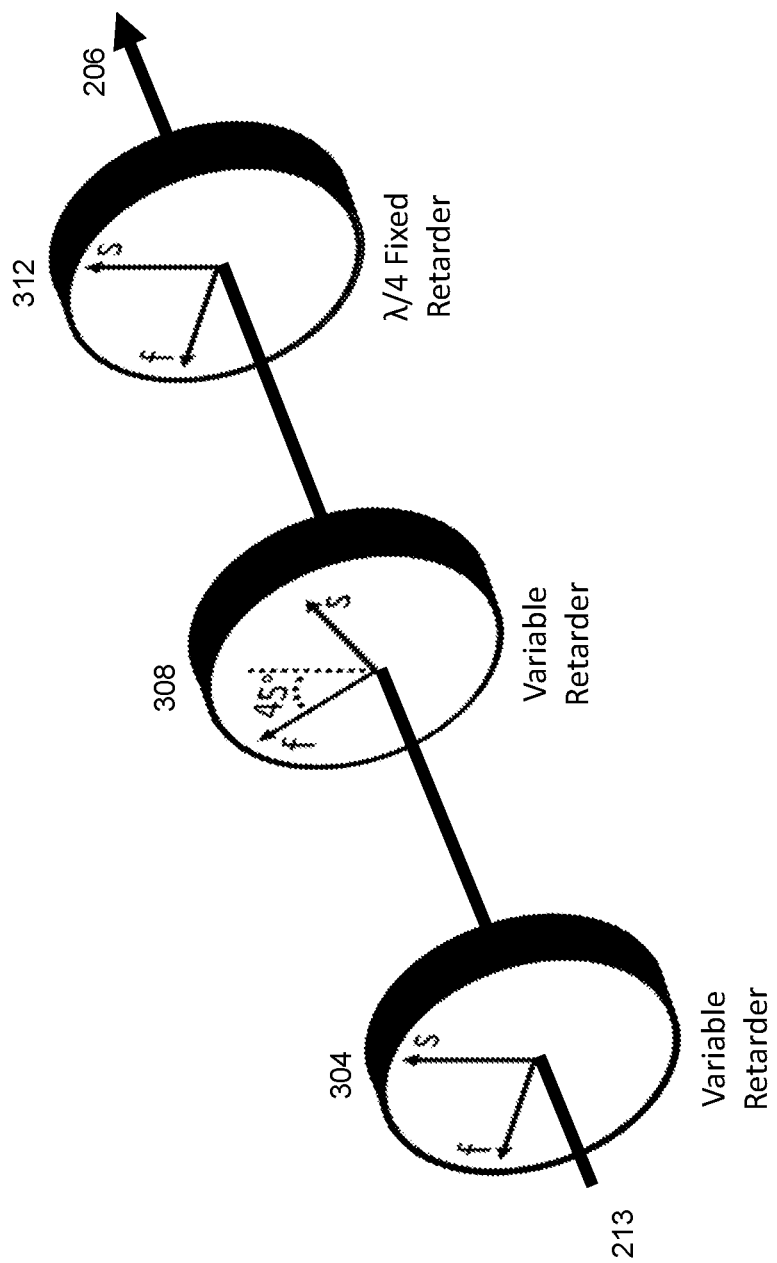
FIGS. 3a and 3b are a schematic block diagrams illustrating optical setups of liquid crystal wave plates used in a cavity showing a preferred embodiment in two orientations according to the present invention.
Figure 3B:
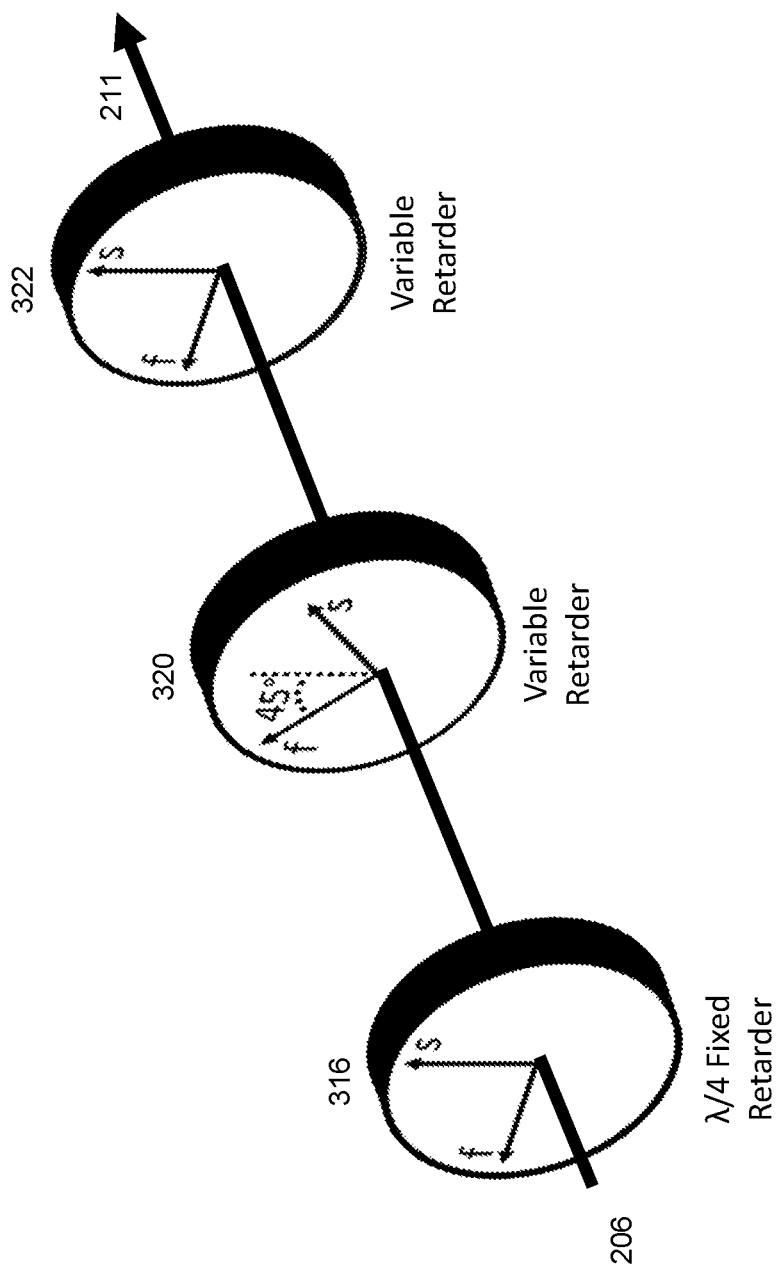

A preferred embodiment for the electronically addressed retarder assemblies, implemented with LCs, is shown in FIGS. 3a and 3b in two orientations. At the fiber output 213, the orientation as shown in FIG. 3a is used, while at the fiber input 211, the order of the elements is mirrored, as shown in FIG. 3b. This arrangement is not the only configuration that provides full control, as inverting the order of elements in either position will accomplish full control as well.

The assembly of FIG. 3a contains two LCs 304, 308 with their fast axes oriented at 45 degrees relative to one another. A quarter wave plate 312 is placed behind the LCs, oriented such that the fast axis is oriented parallel to the fast axis of the first LC 304 (placing it also 45 degrees relative to the second 308). This same assembly may be used in reverse as shown in FIG. 3b, equivalent to switching the positions of the quarter wave plate 316 and the first LC 322 on either side of LC 320, to give the second configuration. Varying the retardance of LCs 304, 308, 320, 322 will vary the polarization state of the light passing through the assembly, giving the required control. Other orientations of LCs are possible, given the cyclical nature of polarization. The modules can be rotated 180° without change to their operation. Similarly, the elements that have been rotated by 45° could have alternately been rotate by −45° with the same result. The orientation of the stacks has been chosen for simplicity; alternate orientations yielding complete control can be chosen with equivalent results.

Figure 4A:
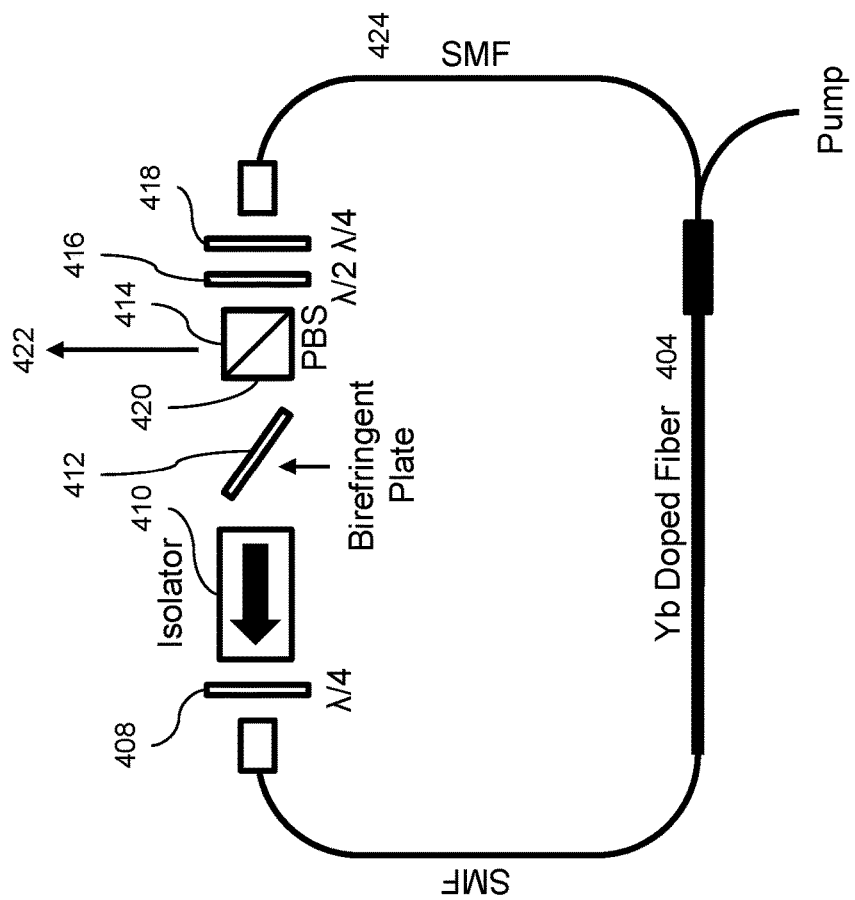
FIG. 4a (Prior Art) is a schematic diagram showing a standard ANDi laser.
Figure 4B:
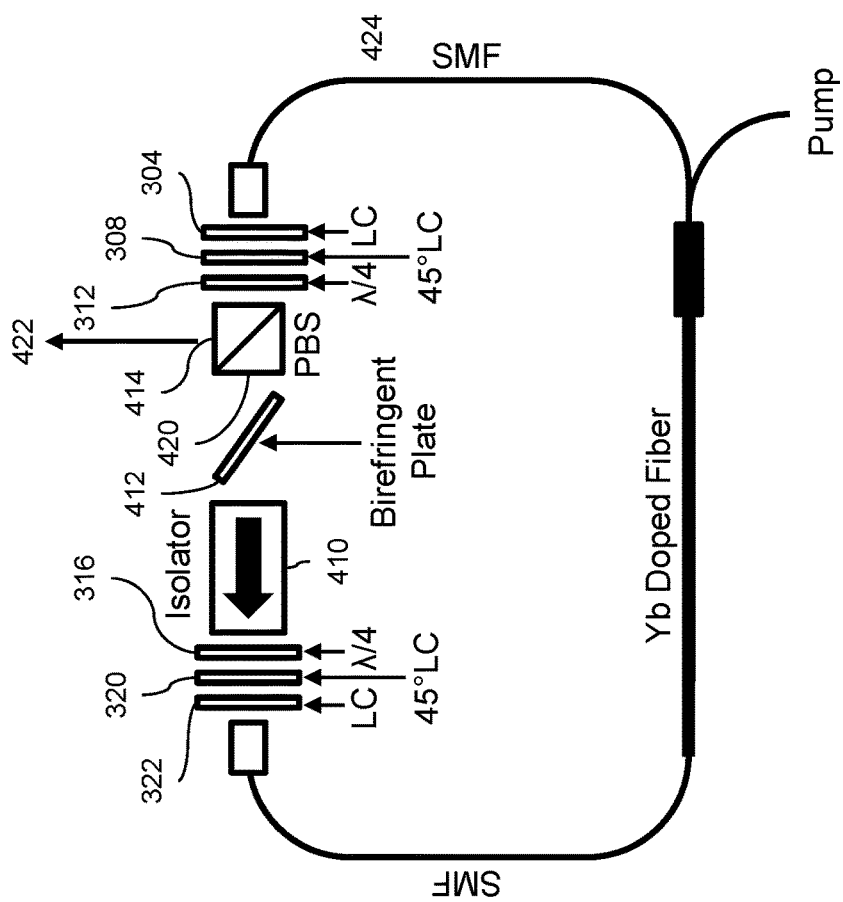
FIG. 4b is a schematic diagram showing an ANDi laser using liquid crystals as electronically variable retarders according to the present invention.

FIG. 4a (Prior Art) is a schematic diagram showing a standard ANDi laser 400 (described in more detail above). FIG. 4b is a schematic diagram showing an ANDi laser 450 according to the present invention, using liquid crystals as electronically variable retarders according to the present invention. To demonstrate the capability of this LC based NPE modelocking scheme, a standard ANDi fiber laser design, shown in FIG. 4a, was modified by replacing the fixed retarders 408, 416, 418 with LC retarder assemblies 300 and 350 as shown in FIG. 4b. Though the laser in this embodiment is an ANDi laser, the technique can equally be applied to any laser oscillator modelocked using NPE.

In use, laser 450 is initially modelocked manually, as in a typical ANDi laser. The birefringent plate 412 filter is adjusted first to operate in the desired wavelength region. The output 422 spectrum and pulse train are monitored. The spectrum is monitored for the characteristic spectral shape indicative of a dissipative soliton and the pulse train is monitored for minimal pulse to pulse variation indicative of a stable modelocked state. The retardance of the four LC elements 304, 308, 320, 322 is varied by manually changing their drive voltages in turn until the laser is modelocked. There are many different modelocking configurations, as is typical with a NPE modelocked fiber laser, and in particular, the ANDi laser configuration. Each of these different modelocked states has different output power, pulse train stability, operating spectrum, output pulse spectral phase, and other laser parameters. It is desirous to choose a state which has properties amenable to the end use of the laser, whether directly for experiments, or as a seed for further amplification. Typical operation of a manually-controlled NPE modelocked laser is to manually search control space until a suitable operational point has been found, an incomplete and often laborious process.

Figure 6:
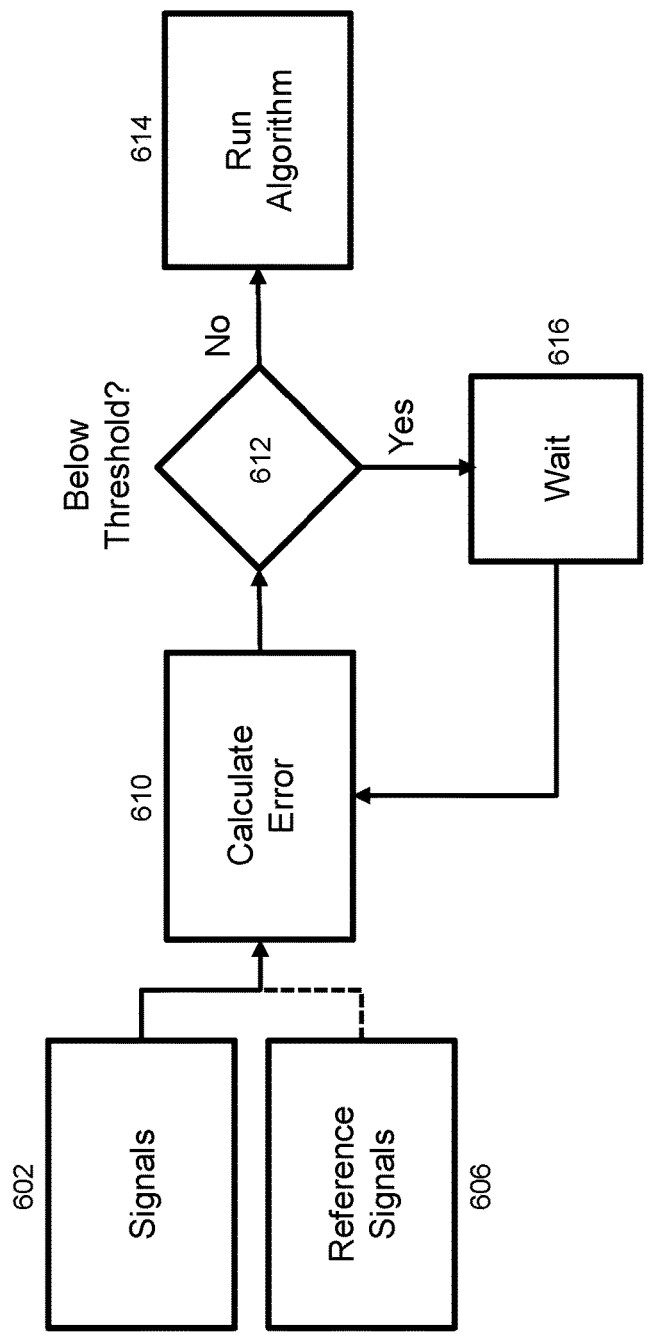
FIG. 6 is a flowchart illustrating a stabilization algorithm operation according to the present invention.

As the polarization state is now electronically controllable, using laser 450 described above, alternative embodiments eliminate this manual modelocking step, and allow an algorithm to test a variety of states and optimize the modelocking of the laser (see FIG. 6). To achieve this, a measure of the fitness of the laser state must be defined. This could include but is not limited to: whether the laser is modelocked, the shape of the spectrum or spectral similarity to previous spectra, the output power of the laser, or the transform-limited pulse duration of the measured spectrum.

Figure 5:
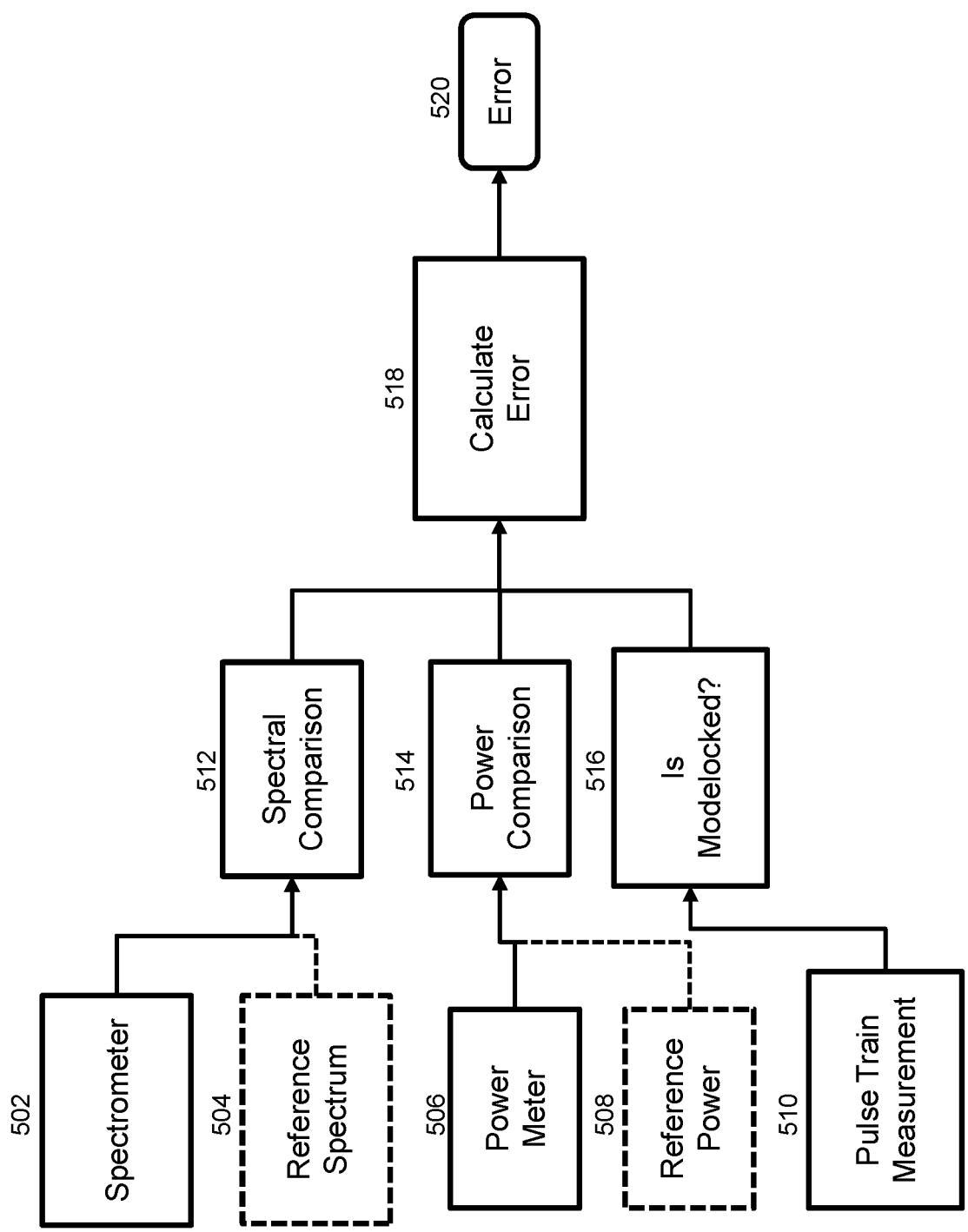
FIG. 5 is a flowchart illustrating implementation of a fitness function according to the present invention.

FIG. 5 shows one implementation of a fitness function, wherein the spectrum is monitored using a spectrometer 502 and average power is monitored using a photodiode 506. Reference spectrum 504 and/or reference power 508 may also be inputs. Spectral comparison is performed in step 512 and power comparison is performed in step 514 to determine the proximity of the modelocked stated to a desired state.

The pulse train is also monitored using a fast photodiode 510. The electronic signal from the photodiode is generally band-pass filtered (not shown) to a relatively narrow band around the expected repetition rate and the RF power through the filter measured. This measured power is compared to a threshold, which becomes a binary indicator of whether the laser can be considered modelocked or not 516. These signals, among others, can be used alone or in concert with one another to calculate the error in step 518. Error 520 is used to provide a feedback signal that is based on to the modelocked state of the laser, as well as the proximity of the modelocked stated to desired state.

One embodiment of the fitness function is to calculate the coefficient of determination, $R^2$, between the measured spectrum and the target spectrum. In another embodiment, this value is used if the modelock indicator is true, and zero is returned if the laser is not modelocked. In another, the fitness is calculated as the sum (with or without weighting) of the $R^2$ value and the fractional change in output power versus the reference power. In general, the measurements of the laser parameters can be collapsed into one or more numbers that determine how close you are to a desired solution.

Once control is gained over the laser cavity and a defined fitness function, optimization is desirable (see FIG. 6). The high dimensionality of the search space makes exhaustive testing of every possible state of the laser prohibitively time consuming. Thus, it is useful to utilize preexisting metaheuristics for optimization. A multitude of conventional optimization algorithms could be applied to this problem, including iterative local methods like gradient descent or hill climbing, global methods like simulated annealing or threshold accepting, population-based heuristics like evolutionary algorithms or particle swarms. Such algorithms can also be used in conjunction with one another, for example a memetic algorithm in which a local optimization strategy is applied to each member of a population-based algorithm during optimization.

FIG. 6 shows the flow of the optimization algorithm 600 targeting a particular operating condition. The signals 602 derived from the current laser state, which could include spectrum, power, and/or modelocked states, among others, are used to calculate the error signal 610. In some implementations, the error signal will also depend on a set of reference signals 606, derived from the laser or another laser at some prior time or operating point. The calculated error is then compared 612 to an error threshold. Below this threshold, the laser is considered within the desired operating region and optimization is not necessary 616. If the error is above threshold, the algorithm 614 will execute the appropriate optimization procedure to run (e.g. to adjust LC's 304, 308, 320, 322). This selection can be based on the magnitude of the error at present or the error trend over time, among other options. The selected optimization algorithm can be run for a fixed number of iterations in some implementations, or until the error signal drops below the threshold in an alternate implementation.

Figure 7:
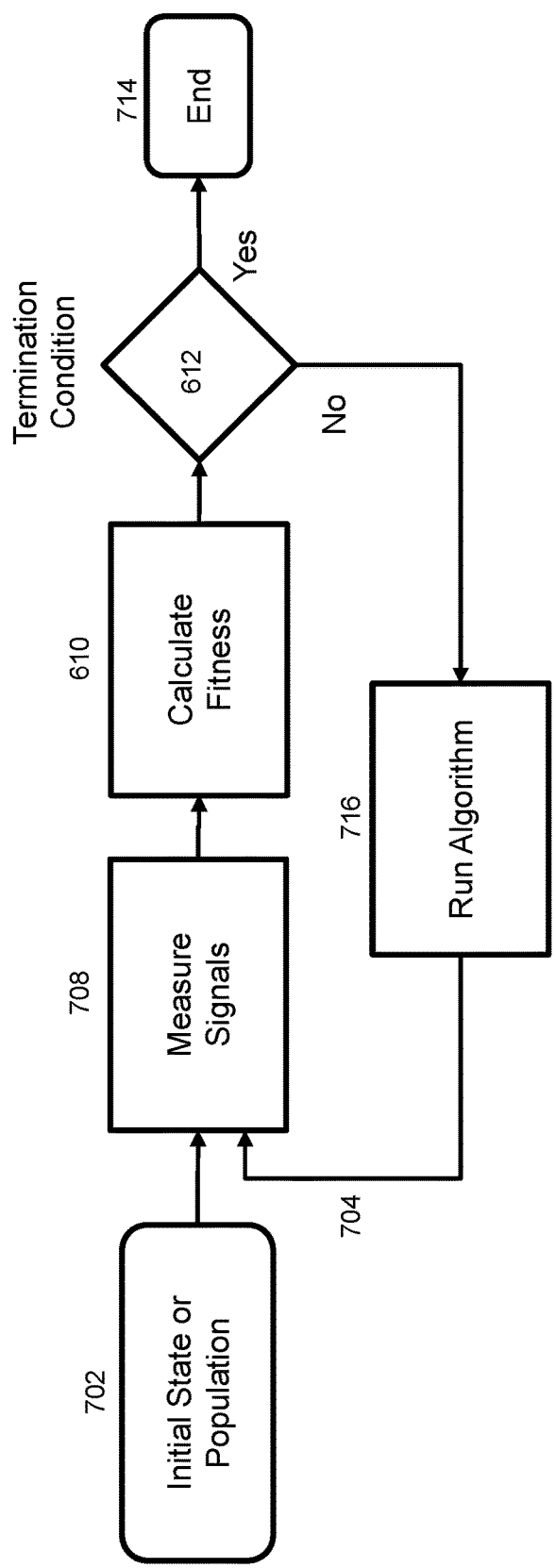
FIG. 7 is a flowchart illustrating automatic modelocking operation according to the present invention.

FIG. 7 shows the flow of an optimization algorithm 700 used for automatic modelocking. In this case, in contrast to the previous optimization, there need not be a target set of signals to optimize toward. Rather, the laser can start with a particular state 702 (or a population of states, be it/they previous state(s) or a randomly generated state(s), among others) and calculate 710 its/their fitness based on measured aspects 708 of the laser operation, e.g. spectrum, power, cavity repetition frequency, pulse train measurement. Such fitness metrics are then used to determine 712 if a current operating point meets the requirements of the user. If so, optimization ends 714. If not, an optimization algorithm is run 716. An example of such an algorithm is shown in FIG. 7.

Figure 8A:
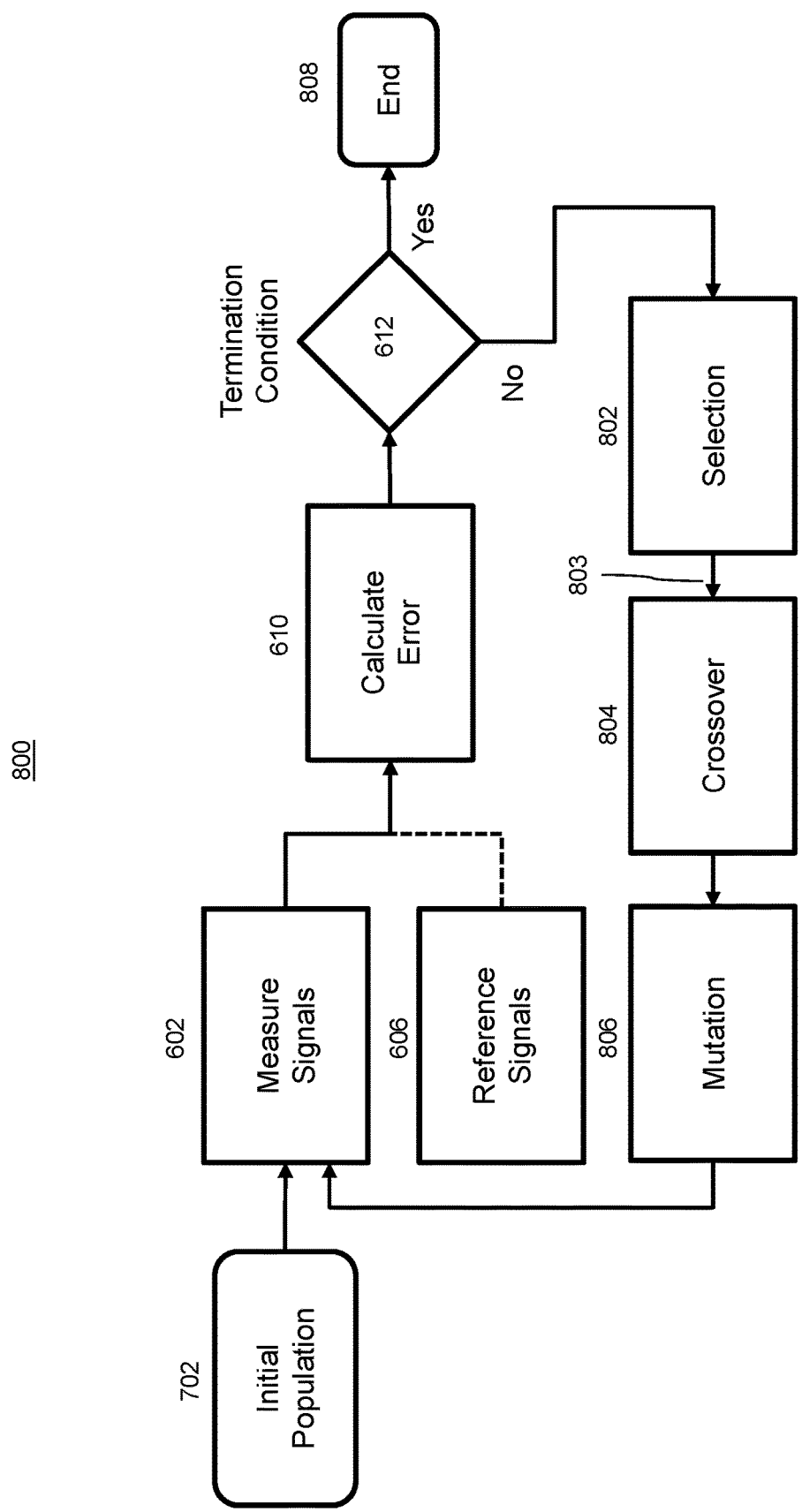
FIG. 8a is a flowchart illustrating a genetic algorithm used for automatic modelocking as shown in FIG. 7.

FIG. 8a shows the flow of a genetic optimization algorithm 800 that can be used for automatic modelocking. The initial population 702 is measured 602 using the fitness function 510. In some implementations, a reference measurement set 606 is provided. If the error level is below the preset threshold 612 then the process ends 808. If the error is above the threshold, some subset of the population will be selected to be modified 802. This selection can be based on fitness, population diversity, or random. Crossover 804 is then performed on the selected population members 803, in which control values from different population members are swapped to generate new members. The new population is then mutated 806, in which different control values are modified randomly.

Figure 8B:
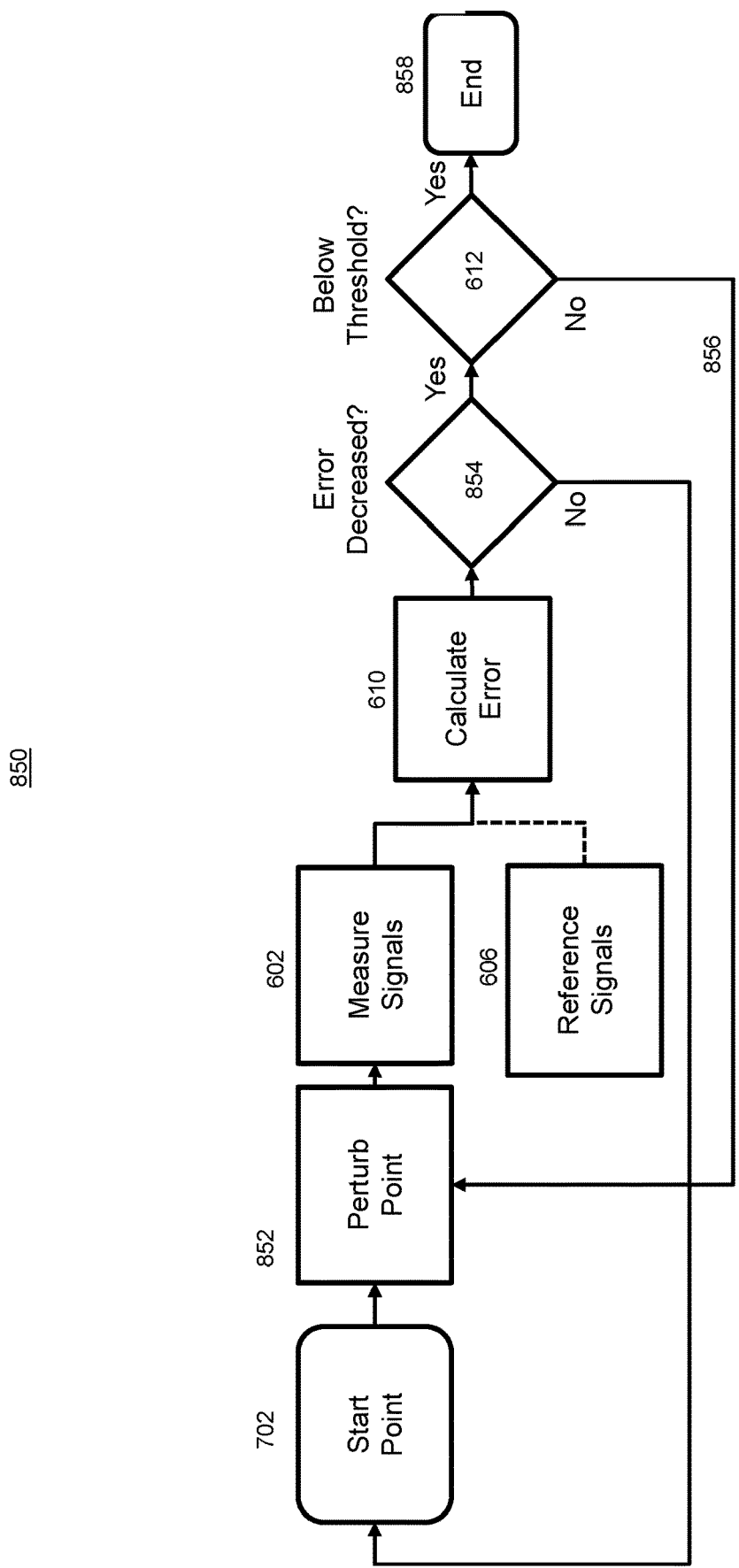
FIG. 8b is a flowchart illustrating an optimization algorithm used for optimized modelocking according to the present invention.

FIG. 8b shows the flow of a simple optimization algorithm 850 for optimizing modelocking. The initial state or population 702 is perturbed 852 by varying one or more control voltages and the result measured 602 using the fitness function 610. In some implementations, a reference measurement set 606 is provided. The error is compared to the previous error 854. If the error has increased, the new state is discarded and the process returns to the start point 702. If the error has decreased, it is compared to the threshold 612. If it is below the threshold, then the process ends 858. If the error level is above the threshold, the perturbed state is kept and perturbed again 856.

Figure 9A:
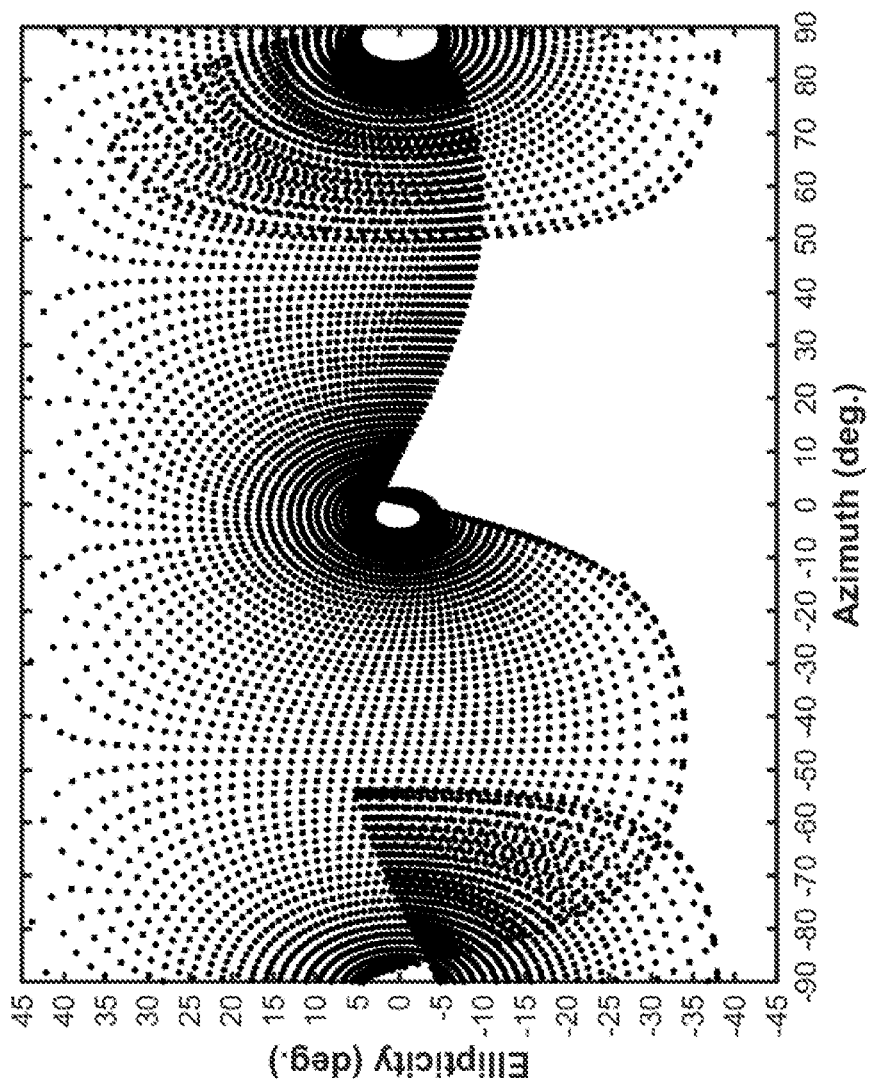
FIG. 9a is a plot showing the measured coverage of the polarization state space accessible by the assembly as described in FIG. 3a with less than a full wave of retardance.

FIG. 9a shows a measured plot of the ellipticity and azimuth angles of the polarization for a sparse sampling of the electronically addressed polarization assembly. In this case, one hundred one evenly spaced control voltages were applied to each electronically addressed retarder 304, 308, 320, 322 and the polarization was measured. In this plot, the maximum retardance applied is less than a full wave, leading to a notable gap in the plot of accessible polarization states. However, this level of control allows access to a majority of polarization states and is still sufficient for the modelocking of a laser.

Figure 9B:
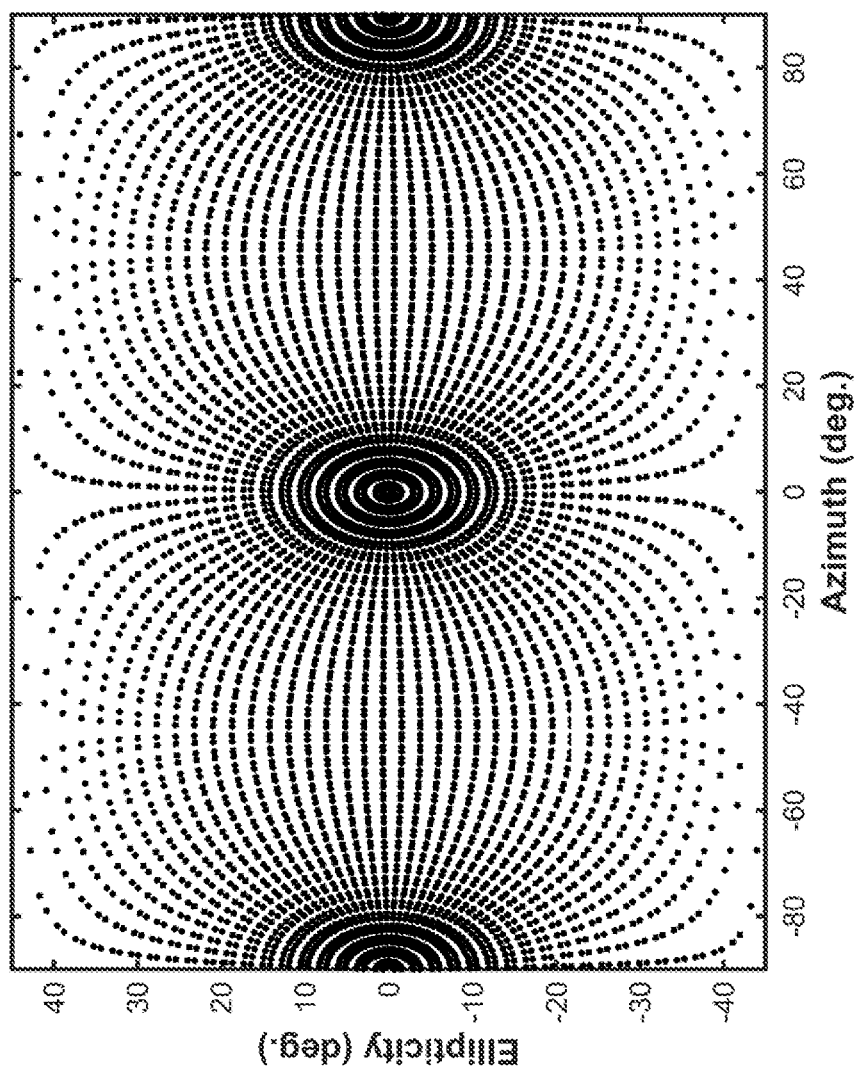
FIG. 9b is a plot showing the simulated coverage of the polarization state space accessible by the assembly as described in FIG. 3a with a full wave of retardance.

FIG. 9b shows a calculated plot of the ellipticity and azimuth angles of the polarization for a sparse sampling of the electronically addressed polarization assembly. In this case, one hundred one evenly spaced retardances for each retarder are used to calculate the resulting polarization. As the retardances in this case span the full range, access to the complete set of polarization states is enabled. As polarization is a continuous function of the retardances, the shown gaps between points are a result of the sampling (chosen to match the measured data). No gaps exist for a theoretical retarder.

Figure 10:
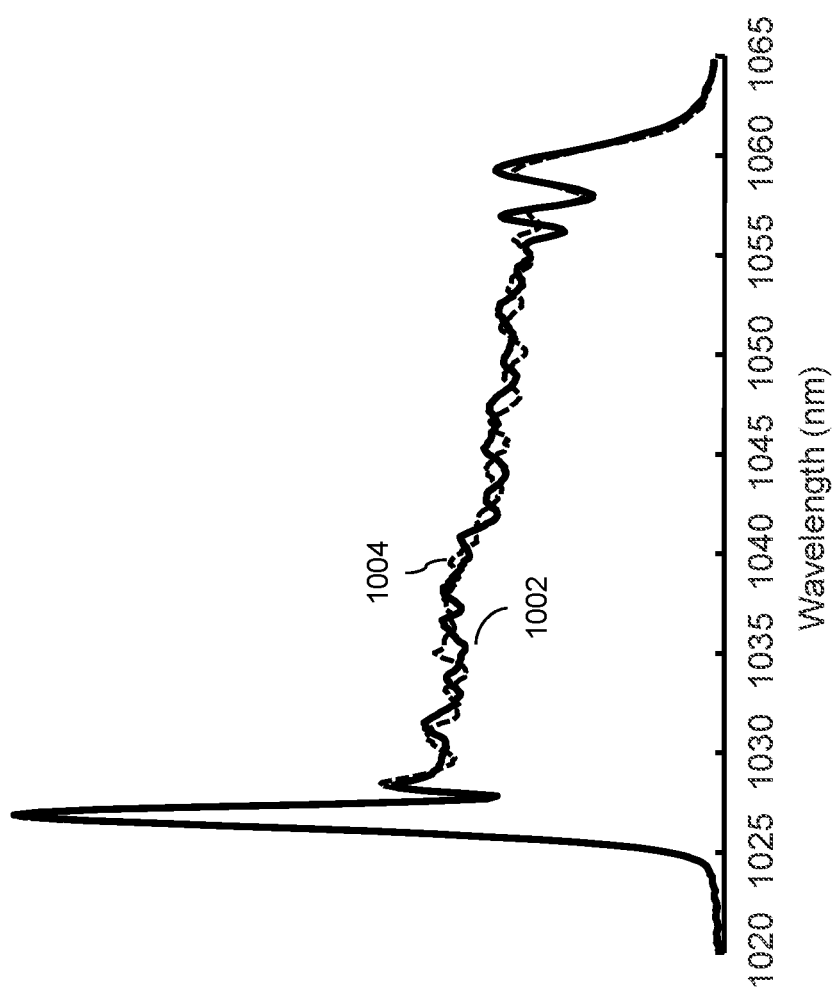
FIG. 10 is a plot showing the spectrum of LC mode locked ANDi laser (solid) recovered by the genetic algorithm of FIG. 8a from a random starting point using a target spectrum (dashed).

FIG. 10 shows the spectrum of a modelocked ANDi laser found using a genetic algorithm (see FIG. 8a) implementation of the automatic modelocking (see FIG. 6), with the fitness calculated as the $R^2$ of the measured spectrum 1002 (solid) and the target spectrum 1004 (dashed). The algorithm converged to this solution in nine generations using a population size of 50. The mutation rate was allowed to vary based on the value of the fitness function, and the crossover probability was fixed at 25%. Two months had passed between the recording of the operational state, and the recovery of that state from a random starting point.

In addition to initiating modelocking in a laser by searching for a target set of parameters, the electronic controls can be used to maintain the laser operation in a particular state. In a preferred implementation, the modelocked laser runs without intervention from the algorithm until the error, which is being constantly monitored, goes above a certain threshold. The algorithm will then begin applying small perturbations to the controls to lower the error. The algorithm can run for a set number of iterations, or until another condition is met, for example, the error drops back below a threshold. This threshold may either be the same as the threshold that caused the perturbations to begin, or can be lower (leaving some dead space to avoid frequent switching of the algorithm on and off).

Using an algorithm such as that shown in FIG. 8b, the laser is maintained in a specific operating state. Changing the environmental temperature of the laser causes the laser operating point to change, resulting in change in pulse duration. This can be seen in FIG. 11a (Prior Art), in which the pulse duration 1102 is shown to vary as the environmental temperature 1104 varies over time. A grating compressor is set to minimize pulse duration at the beginning of the temperature data run.

Figure 11A:
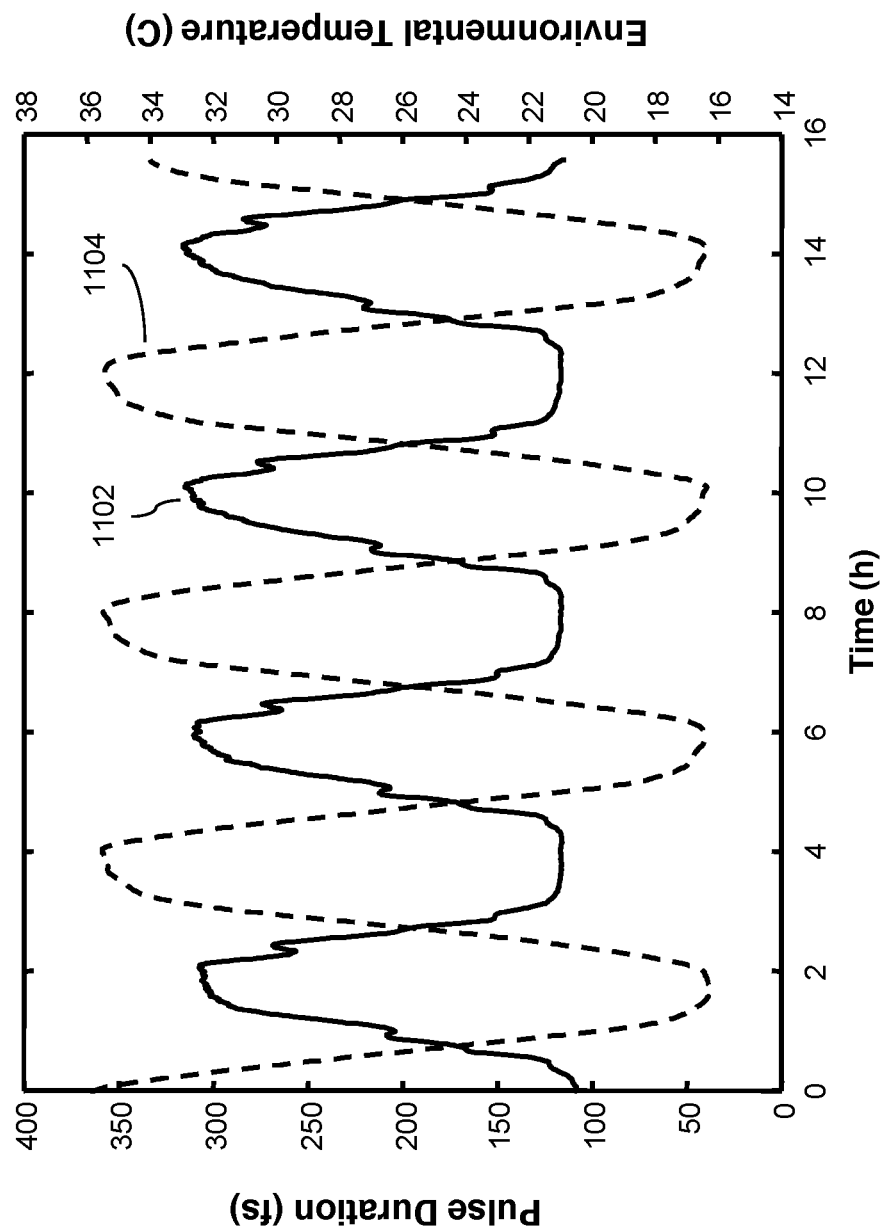
FIG. 11a (Prior Art) is a plot showing compressed pulse duration as a function of environmental temperature in a standard NPE modelocked oscillator without electronic control.
Figure 11B:
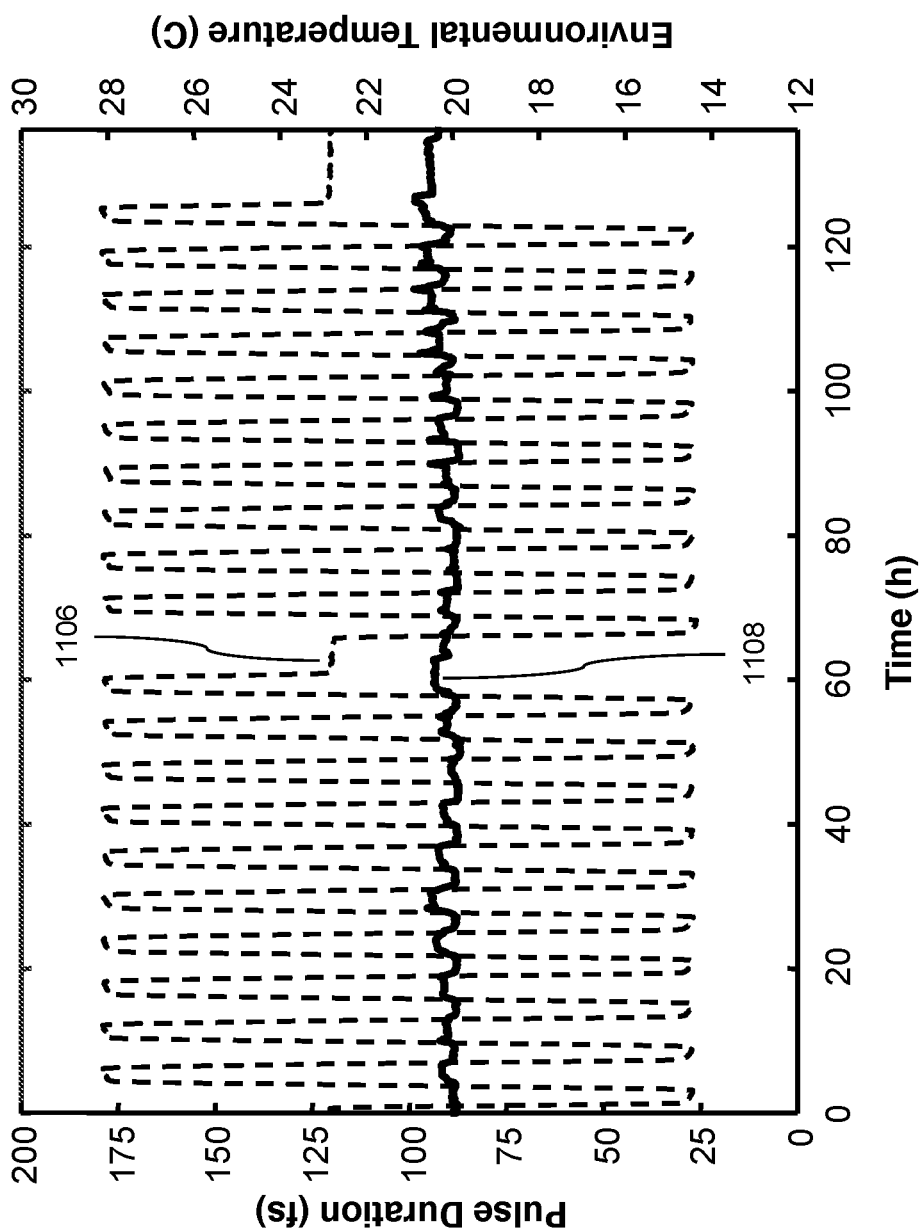
FIG. 11b is plot showing a LC stabilized oscillator (minimizing spectral error and power error) according to the present invention. The inset shows a sample temporal pulse.

This large change in pulse duration from the uncontrolled laser can be well corrected with a locking algorithm (implemented as described above) in a laser constructed identically to that used to produce FIG. 11a but with the inclusion of our LC elements. The pulse duration 1108 in this case, shown in FIG. 11b, has an RMS deviation of 2.2 fs with average pulse duration of 90 fs in spite of the temperature variation 1106.

The complete control of an NPE modelocked fiber laser, giving robustness to environmental perturbations as well as long term drift, is a significant advance in the field of non-polarization-maintaining fiber oscillators. With the control described in this invention, a laser can be maintained at a set operational point for as long as the components used to construct the laser last (typical lifetimes are more than 10 years). This robustness, combined with the short pulse durations achievable with NPE modelocked lasers, gives compelling value to the user of such a laser.

While the exemplary preferred embodiments of the present invention are described herein with particularity, those skilled in the art will appreciate various changes, additions, and applications other than those specifically mentioned, which are within the spirit of this invention.

The invention claimed is:

1. Apparatus for modelocking a fiber laser which is configured to produce laser output light given pump laser input light comprising:
   a first variable retarder assembly;
   a section of optical fiber providing a nonlinear change to a polarization state of light;
   a second variable retarder assembly;
   a polarizing element for outputting low intensity light providing saturable loss; and
   a control system;
   wherein the first assembly includes two electronically addressed variable phase retarders and a single fixed phase retarder;
   wherein the first assembly is configured to prepare a polarization state of light suitable for nonlinear polarization evolution (NPE) modelocking to launch into the optical fiber;
   wherein the second assembly includes two electronically addressed variable phase retarders and a single fixed phase retarder;
   wherein the second assembly is configured to control a polarization state of light received from the optical fiber before being incident on the polarizing element; and
   wherein the control system is configured to control the variable phase retarders.

2. The apparatus of claim 1 wherein the control system comprises:
   a measuring system configured to measure aspects of laser performance related to modelocking;
   an error calculating module for calculating an error based upon the measured aspects of laser performance and desired aspects of laser performance; and
   a modification system configured to select amounts of retardation applied by the variable phase retarders based upon the calculated error.

3. The apparatus of claim 2 wherein the measuring system monitors the measured aspects of laser performance on an ongoing basis.

4. The apparatus of claim 2 wherein the measured aspects of laser performance include at least one of: whether the laser is modelocked, noise of laser pulse train output, spectrum of laser output, and power of laser output.

5. The apparatus of claim 2 wherein the error calculating module calculates error based on deviation of the measured aspects of laser performance from reference values.

6. The apparatus of claim 2 wherein the error calculating module calculates error based on calculated properties of the measured aspects of laser performance.

7. The apparatus of claim 2 wherein the variable phase retarders comprise phase retarders chosen from among the following: nematic liquid crystals, ferroelectric liquid crystals, photopatterned liquid crystals, and magnetooptic phase shifters.

8. The apparatus of claim 2 wherein the laser is an all-normal dispersion (ANDi) laser.

9. The apparatus of claim 2 wherein the modification system is configured to optimize a modelocked state of the laser such that the laser operates substantially at a reference state.

10. The apparatus of claim 2 wherein the modification system is configured to automatically discover modelocked states of the laser.

11. The apparatus of claim 1 wherein the variable phase retarders comprise phase retarders chosen from the among the following: nematic liquid crystals, ferroelectric liquid crystals, photopatterned liquid crystals, and magnetooptic phase shifters.

12. The apparatus of claim 1 wherein one of the assemblies comprises two liquid crystal phase retarders in sequence and configured such that their ordinary axes are oriented at 45° relative to each other, and a quarter wave plate configured after the two liquid crystal phase retarders and having its ordinary axis parallel to the ordinary axis of the first liquid crystal phase retarder in the sequence.

13. The apparatus of claim 1 wherein one of the assemblies comprises a quarter wave plate followed by a first liquid crystal phase retarder having its ordinary axis 45° away from the ordinary axis of the quarter wave plate, in turn followed by a second liquid crystal phase retarder having its ordinary axis parallel to the ordinary axis of the quarter wave plate.

14. The apparatus of claim 1 wherein one of the assemblies comprises two liquid crystal phase retarders in sequence and configured such that their ordinary axes are oriented at 45° relative to each other, and a quarter wave plate configured after the two liquid crystal phase retarders and having its ordinary axis parallel to the ordinary axis of the first liquid crystal phase retarder in the sequence; and
   wherein the other assembly comprises a quarter wave plate followed by a first liquid crystal phase retarder having its ordinary axis 45° away from the ordinary axis of the quarter wave plate, in turn followed by a second liquid crystal phase retarder having its ordinary axis parallel to the ordinary axis of the quarter wave plate.

15. The apparatus of claim 1 wherein the laser is an all-normal dispersion (ANDi) laser.

16. The apparatus of claim 1 wherein each assembly is configured to have sufficient retardance range to enable access to a substantially complete set of polarization states.

17. The apparatus of claim 1 wherein each assembly is configured to have sufficient retardance range to enable access to a majority of polarization states.

18. The apparatus of claim 1 wherein the fiber is chosen from among: single mode fiber, photonic crystal fiber, and gain fiber.

19. The apparatus of claim 1 wherein the second assembly is further configured to control the output light from the laser.

20. The method of modelocking a fiber laser comprising the steps of:
- providing first and second variable retarder assemblies, each having two liquid crystals and a single fixed wave plate;
- providing a section of optical fiber configured to provide a nonlinear change to a polarization state of light in the laser;
- providing a polarizing element for outputting low intensity light from the laser to provide saturable loss;
- electronically addressing the liquid crystals in one assembly to prepare a polarization state of light suitable for nonlinear polarization evolution (NPE) modelocking and launching it into the optical fiber;
- electronically addressing the liquid crystals in the other assembly to vary polarization of light received from the fiber, and providing it to polarizing element;
- measuring aspects of laser performance related to modelocking;
- calculating an error based on the measured aspects of laser performance and desired aspects of laser performance; and
- modifying retardance of the liquid crystals based upon the calculated error.

* * * * *